3,822,992
EXHAUSTION DYEING PROCESS WITH ANTHRA-
QUINONE DYESTUFFS IN WATER IMMISCIBLE
ORGANIC SOLVENT
Volker Hederich and Günter Gehrke, Cologne, and Hans-
Samuel Bien, Burscheid, Germany, assignors to Bayer
Aktiengesellschaft, Leverkusen, Germany
No Drawing. Original application Oct. 12, 1970, Ser. No.
80,208, now abandoned. Divided and this application
Feb. 28, 1973, Ser. No. 336,530
Int. Cl. D06p 1/20, 3/54
U.S. Cl. 8—39                                12 Claims

ABSTRACT OF THE DISCLOSURE

New anthraquinone dyestuffs of the formula

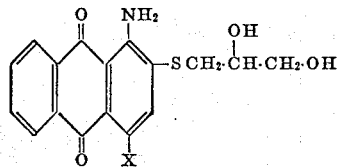

in which X denotes a hydroxyl, $C_1$–$C_6$-alkyl-carbonyl-amino, $C_1$–$C_6$ - alkyl - sulphonylamino, $C_1$–$C_6$-alkoxy-carbonylamino, optionally substituted aryl-carbonylamino, aryl-sulphonylamino, aryloxy-carbonylamino or heteroylamino group and their preparation from corresponding 2-halogen-anthraquinones. They are used for dyeing synthetic fibre materials from organic solvents, especially from those which are immisicible with water, according to the exhaustion process.

---

This is a division of application Ser. No. 80,208, filed Oct. 12, 1970, now abandoned.

The present invention relates to anthraquinone dyestuffs more particularly it concerns anthraquinone dyestuffs of the formula

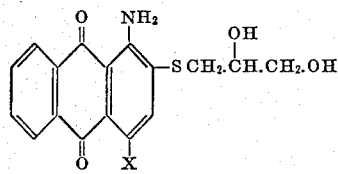

in which

X denotes a hydroxyl, $C_1$–$C_6$-alkyl-carbonylamino, $C_1$–$C_6$-alkyl - sulphonylamino, $C_1$–$C_6$-alkoxy-carbonylamino, optionally substituted aryl-carbonylamino, aryl-sulphonylamino, aryloxy-carbonylamino or heteroylamino group, and their use for dyeing synthetic fibre materials from organic solvents according to the exhaustion process.

As the $C_1$–$C_6$-alkyl-carbonylamino or -sulphonylamino group, the following may be mentioned by way of example: the methyl-, ethyl-, propyl-, butyl-, pentyl-, hexyl- and cyclohexyl-carbonylamino or -sulphonylamino group;

As the $C_1$–$C_6$-alkoxy-carbonylamino group: the methoxy-, ethoxy-, propoxy- and hexoxy-carbonylamino group;

As the aryl-carbonylamino group: the phenyl-, methylphenyl-, diphenyl-, chlorophenyl-, dichlorophenyl-, methoxyphenyl-, nitrophenyl-, methylnitrophenyl-, α-naphthyl- and β-naphthyl-carbonylamino group;

As the aryl-sulphonylamino group: the phenyl-, methylphenyl-, chlorophenyl-, dichlorophenyl-, nitrophenyl- and naphthyl-sulphonylamino group;

As the aryloxy-carbonylamino group: the phenoxy- and 4-nitrophenoxy-carbonylamino group; and As the heteroylamino group: the α-furane-, α-thiophene-, nicotine-, iso-nicotine- and α-quinoline-carbonylamino group.

Representatives of the anthraquinone dyestuffs of formula I, according to the invention, are quoted in the examples.

The anthraquinone dyestuffs of formula I are prepared by the reaction of anthraquinones of formula

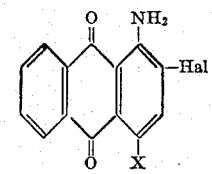

wherein X has the meaning given above and Hal denotes a chloro or bromo atom with thioglycerine, using solvents which are inert under the reaction conditions such as pyridine, dimethylformamide or N-methyl-pyrrolidone, optionally in the presence of an acid binding agent such as inorganic or organic bases.

The dyestuffs of formula (I) are excellently suited to the dyeing of synthetic fibre materials from organic solvents according to the exhaustion process, especially from such organic solvents as are immiscible with water and of which the boiling points lie between 40 and 170° C., for example aromatic hydrocarbons such as toluene and xylene, and halogenated hydrocarbons, especially aliphatic chloro-hydrocarbons, such as methylene chloride, chloroform, carbon tetrachloride, 1,1-dichlorethane, 1,2-dichloroethane, 1,1,2 - trichloroethane, 1,1,1,2 - tetrachlorethane, 1,1,2,2 - tetrachloroethane, pentachlorethane, 1-chloropropane, 1,2-dichloropropane, 1,1,1,-trichloropropane, 1-chlorobutane, 2-chlorobutane, 1,4-dichlorobutane, 1-chloro-2-methylpropane or 2-chloro-2-methylpropane, as well as aliphatic fluoro- or fluoro-chloro-hydrocarbons, such as perfluoro-n-hexane, 1,2,2-trifluoro-trichlorethane and 1,1,1 - trifluoropentachloropropane, and aromatic chloro- and fluorohydrocarbons, such as chlorobenzene, fluorobenzene, chlorotoluene and benzotrifluoride. Tetrachlorethylene, trichlorethylene and 1,1,1-trichlorethane have proved particularly suitable. Mixtures of these solvents can also be used.

It has frequently proved advantageous for the dyeing liquors to contain small amounts, that is to say up to 1 percent by weight, preferably 0.5 percent by weight, of water relative to the weight of the organic solvents.

Furthermore, an addition of non-ionic auxiliary agents to the dyeing liquors has proved of value in some cases. Possible non-ionic auxiliary agents are especially the known surface-active ethoxylation and propoxylation products of fatty alcohols, alkylphenols, fatty acid amides and fatty acids as well as their mixtures; the auxiliary agents are employed in an amount of 0.05–2 percent by weight relative to the weight of the organic solvent. Instead of adding the auxiliary agents directly to the dyeing liquors, they can with advantage also be used for working the dyestuffs into a dough and in this way be added to the dyeing liquors in the form of a dyestuff-auxiliary agent dough.

The synthetic fibre materials to be dyed with the dyestuffs of formula (I) according to the invention are above all fibre materials of polyesters, for example polyethylene terephthalates or polycyclohexanedimethylene terephthalate, of cellulose triacetate, cellulose 2½-acetate, polyacrylonitrile, synthetic polyamides, such as hexamethylenediamine adipate, poly-ε-caprolactam or ω-aminoundecane-acid, and polyurethanes. The fibre materials can be in the most diverse processing stages, for example in the form of filaments, flock, tops, yarn, piece goods, such as woven fabrics or knitted fabrics, or made-up goods.

The dyeing according to the invention is preferably carried out in closed apparatuses, for example by introducing the fibre materials into the dyebath at room temperature, heating the dyebath to 60–170° C. and keeping it at this temperature until the liquor is exhausted; this is generally the case after 10–60 minutes. After cooling to room temperature, the liquor is separated off and the fibre materials are, optionally after brief rinsing with fresh organic solvent, freed of the adhering solvent by suction treatment or centrifuging and subsequent drying in a warm stream of air. With the aid of the process according to the invention it is possible to dye synthetic fibre materials in a simple manner from organic solvents to give high dyestuff yields and excellent fastness properties.

The dyestuffs according to the invention are largely insoluble in the organic solvents which are immiscible with water. They are distinguished from the dyestuffs hitherto used for dyeing synthetic fibre materials from organic solvents by a significantly better affinity and an increased fastness to sublimation. A further advantage of the dyestuffs according to the invention consists of the fact that the depth of colour of the resulting dyeings is, for a given dyestuff: goods to be dyed ratio, largely independent of the concentration of the dyestuff in the dyeing liquor and hence also independent on the liquor ratio. Because of this independence of the liquor ratio employed, the dyestuffs according to the invention can be carried out in all known dyeing devices, such as winch dyers, jiggers and the like, which are known each to work with a different liquor ratio, and yield reproducible dyeings.

It should be pointed out that mixtures of the dyestuffs according to the invention at times give a better colour yield than the individual dyestuffs.

The parts indicated in the examples which follow are parts by weight, unless otherwise stated.

EXAMPLE 1

100 parts of a woven fabric of texturised polyethylene terephthalate fibres are introduced at room temperature, without prior cleaning, into a dyebath which is prepared from 1 part of 1-amino - 2-(2,3-dihydroxy-propylmercapto)-4-hydroxyanthraquinone and 1000 parts of tetrachlorethylene. The bath is heated to 115° C. over the course of 10 minutes with vigorous circulation of the liquor and is kept at this temperature for 30 minutes. The liquor is then separated off and the goods being dyed are rinsed with fresh solvent for 5 minutes at about 40° C. After separating off the rinsing liquor, the goods being dyed are centrifuged and dried in a stream of air. A strong ruby-red dyeing having excellent fastness to sublimation as well as very good fastness to washing and rubbing is obtained.

An equivalent ruby-red dyeing was obtained in the same manner on a woven fabric of polycyclohexane-dimethylene terephthalate fibres.

If the tetrachlorethylene is replaced by the same amount of 1,1,2-trichloroethane, an equivalent dyeting is obtained.

The dyestuff used had been manufactured as follows: 32 parts of 1-amino-2-bromo-4-hydroxy-anthraquinone were dissolved in 150 parts of pyridine, mixed with 7 parts of powdered potassium hydroxide and 20 parts by volume of thioglycerine, and stirred for 3 hours at 45–50° C. After adding 180 parts of methanol and 10 parts of glacial acetic acid, the dyestuff which had separated out was filtered off and washed with methanol and water. 32.5 parts of dyestuff were obtained melting at 186–187° C. after recrystallisation from anisole.

EXAMPLE 2

100 parts of a woven fabric of triacetate fibres are introduced at room temperature into a dyebath which is prepared from 1 part of 1-amino-2-(2,3-dihydroxy-propylmercapto) - 4 - benzenesulphonamido-anthraquinone and 1000 parts of tetrachlorethylene. The bath is heated to 110° C. over the course of 20 minutes with vigorous circulation of the liquor, and is kept at this temperature for 45 minutes. The liquor is then separated off and the woven fabric is rinsed with fresh tetrachlorethylene at 40° C. After separating off the rinsing liquor, the goods being dyed are freed of the adhering solvent by centrifuging and drying in a stream of air. A full, ruby-red dyeing of excellent fastness properties is obtained.

If the 1000 parts of tetrachlorethylene are replaced by the same amount of 1,1,2-trichlorethane, 1,1,1,2-tetra-chlorethane, 1,1,2,2-tetrachlorethane, pentachlorethane, 1,2-dichloropropane, 2-chlorobutane, 1,4-dichlorobutane, chlorobenzene or chlorotoluene, equivalent dyeings were obtained.

The dyestuff used had been obtained as described in Example 1, except that instead of the 32 parts of 1-amino-2-bromo-4-hydroxy-anthraquinone the equivalent amount of 1-amino-2-bromo - 4 - benzenesulphonamido-anthraquinone was used.

EXAMPLE 3

100 parts of yarn of acetate filaments are introduced at about 22° C. into a dyebath which is prepared from 1 part of the dyestuff used in Example 1, 1000 parts of tetrachlorethylene, 1.5 parts of oleic acid ethanolamide, 1.5 parts of oleyl alcohol heptaethylene glycol ether and 6 parts of water. The bath is warmed to 78° C. over the course of 20 minutes and kept at this temperature for 45 minutes. After separating off the dyeing liquor and rinsing with fresh tetrachlorethylene, the goods being dyed are freed of the adhering solvent by suction treatment and drying in a stream of air. A brilliant ruby-red dyeing is obtained.

EXAMPLE 4

100 parts of polyacrylonitrile fibre yarn are dyed in a bath which is prepared as described in Example 3. The bath is warmed to 100° C. over the course of 20 minutes and kept at this temperature for 30 minutes. After the usual washing and drying, a ruby-red dyeing having good fastness properties is obtained.

EXAMPLE 5

100 parts of fibre yarn of poly-ε-caprolactam are introduced at room temperature into a dyebath which contains 1 part of 1-amino-2-(2,3 - dihydroxy-propylmercapto)-4-benzoylamioanthraquinone in 1000 parts of tetrachlorethylene. The bath is warmed to 100° C. over the course of 20 minutes, with vigorous circulation of the liquor, and is kept at this temperature for 40 minutes. After this time, the liquor is separated off, the goods are briefly rinsed with fresh solvent, and after centrifuging the dyeing is dried in a stream of air. A ruby-red dyeing with good fastness properties is obtained.

An equivalent dyeing was also obtained on yarns of polyhexamethylenediamine adipate fibres.

The colour strength of the dyeing can be increased by adding 1 part of oleic acid ethanolamide, 1 part of oleyl alcohol heptaethylene glycol ether and 4 parts of water to the dyebath.

The dyestuff used had been obtained as described in Example 1, except that instead of the 32 parts of 1-amino-2-bromo - 4 - hydroxy-anthraquinone the equivalent amount of 1-amino-2-bromo - 4 - benzoylamino-anthraquinone was used.

If instead of the dyestuff mentioned, the equivalent amount of one of the dyestuffs listed in the following Table was used, ruby-red dyeings with equivalent fastness properties were obtained on woven fabrics of polyester, triacetate, polyamide, cellulose 2½-acetate, polyacrylonitrile or polyurethane fibres.

| Ex. | Dyestuff |
|---|---|
| 6 | 1-amino-2-(2,3-dihydroxy-propylmercapto)-4-acetylamino-anthraquinone. |
| 7 | 1-amino-2-(2,3-dihydroxy-propylmercapto)-4-propionylamino-anthraquinone. |
| 8 | 1-amino-2-(2,3-dihydroxy-propylmercapto)-4-methoxycarbonylamino-anthraquinone. |
| 9 | 1-amino-2-(2,3-dihydroxy-propylmercapto)-4-ethylsulphonylamino-anthraquinone. |
| 10 | 1-amino-2-(2,3-dihydroxy-propylmercapto)-4-cyclohexylsulphonylamino-anthraquinone. |
| 11 | 1-amino-2-(2,3-dihydroxy-propylmercapto)-4-o-tosylamino-anthraquinone. |
| 12 | 1-amino-2-(2,3-dihydroxy-propylmercapto)-4-(3'-nitro-benzenesulphonylamino)-anthraquinone. |
| 13 | 1-amino-2-(2,3-dihydroxy-propylmercapto)-4-(2',4'-dichloro-benzenesulphonylamino)-anthraquinone. |
| 14 | 1-amino-2-(2,3-dihydroxy-propylmercapto)-4-(4'-methyl-benzoylamino)-anthraquinone. |
| 15 | 1-amino-2-(2,3-dihydroxy-propylmercapto)-4-(2',5'-dichloro-benzoylamino)-anthraquinone. |
| 16 | 1-amino-2-(2,3-dihydroxy-propylmercapto)-4-(4'-chloro-3'-nitro-benzoylamino)-anthraquinone. |
| 17 | 1-amino-2-(2,3-dihydroxy-propylmercapto)-4-(1'-naphthoyl-amino)-anthraquinone. |
| 18 | 1-amino-2-(2,3-dihydroxy-propylmercapto)-4-(2'-naphthoyl-amino)-anthraquinone. |
| 19 | 1-amino-2-(2,3-dihydroxy-propylmercapto)-4-(4'-phenyl-benzoylamino)-anthraquinone. |
| 20 | 1-amino-2-(2,3-dihydroxy-propylmercapto)-4-(2'-naphthyl-sulphonylamino)-anthraquinone. |
| 21 | 1-amino-2-(2,3-dihydroxy-propylmercapto)-4-phenoxy-carbonylamino-anthraquinone. |
| 22 | 1-amino-2-(2,3-dihydroxy-propylmercapto)-4-furanecarbonyl-(2')-amino-anthraquinone. |
| 23 | 1-amino-2-(2,3-dihydroxy-propylmercapto)-4-pyridine-carbonyl-(3')-amino-anthraquinone. |

EXAMPLE 24

50 parts of polyethylene terephthalate filaments are introduced into a dyebath which is prepared from 0.5 parts of the dyestuff used in Example 2 and 0.5 parts of the dyestuff used in Example 5, 1.5 parts of oleic acid ethanolamide, 1.5 parts of oleyl alcohol heptaethylene glycol ether, 6 parts of water and 500 parts of tetrachlorethylene. The bath is heated to 120° C. over the course of 10 minutes, with vigorous circulation of the liquor, and is kept at this temperature for 45 minutes. After separating off the dyeing liquor, the goods being dyed are rinsed with fresh solvent at 40° C. and are dried in a stream of air after removing the rinsing liquor. A deep ruby-red dyeing of excellent fastness to washing and sublimation is obtained.

EXAMPLE 25

100 parts of polyethylene terephthalate woven fabric are dyed for 30 minutes at 115° C. in a dyebath of 1 part of 1 - amino - 2-(2,3-dihydroxy-propylmercapto)-4-p-tosylamino-anthraquinone, 3 parts of oleic acid ethanolamide, 3 parts of oleyl alcohol heptaethylene glycol ether, 12 parts of water and 1600 parts of tetrachlorethylene. After rinsing with fresh tetrachlorethylene and drying, a strong ruby-red dyeing having very good fastness to sublimation, washing and rubbing is obtained.

The dyestuff used had been manufactured in the following manner: 30 parts of 1-amino-2-bromo-4-p-tosylamino-anthraquinone were dissolved in 150 parts of N-methylpyrrolidone and mixed with 6 parts of potassium hydroxide and 20 parts by volume of thioglycerine. The reaction mixture was stirred for ½ hour at 30–40° C., cooled and mixed with 180 parts of methanol, 140 parts of water and 10 parts of glacial acetic acid. Thereafter the dyestuff was filtered off, washed and dried. Yield: 31.2 parts; melting point, after recrystallisation from anisole: 169–170° C.

EXAMPLE 26

100 parts of a woven fabric of textured polyethylene terephthalate fibres are introduced at room temperature, without prior cleaning, into a dyebath which is prepared from 1 part of 1-amino-2-(2,3-dihydroxy-propylmercapto)-4-methanesulphenylamino-anthraquinone and 1000 parts of tetrachlorethylene, and are dyed for 30 minutes at 115° C. After the customary rinsing and drying, a ruby-red dyeing having very good fastness to sublimation, washing and rubbing is obtained.

The dyestuff used had been manufactured as follows: 15 parts of 1-amino-2-bromo-4-methanesulphonamido-anthraquinone were dissolved in 80 parts of pyridine and mixed with 3 parts of powdered potassium hydroxide and 12 parts by volume of thioglycerine. After stirring for one hour at 30–35° C., the reaction mixture was briefly warmed to 60° C., again cooled and mixed with 140 parts of methanol, 3 parts of glacial acetic acid and 30 parts of water. The dyestuff which has crystallised out is filtered off, washed and dried. 14.3 parts were obtained. Melting point, after recrystallisation from ethylene glycol monomethyl ether: 165–166° C.

EXAMPLE 27

100 parts of a woven fabric of triacetate fibres are introduced at room temperature into a dyebath which contains 1 part of 1-amino-2-(2,3-dihydroxy-propylmercapto)-4-(4'-methoxy - benzoylamino) - anthraquinone in 1000 parts of tetrachlorethylene. The bath is warmed to 100° C. over the course of 20 minutes, with vigorous circulation of the liquor, and is kept at this temperature for 40 minutes. After separating off the dying liquor, the goods, being dyed are briefly rinsed with fresh solvent and after centrifuging off the washing liquor are dried in a stream of air. A strong ruby-red dyeing having good fastness properties is obtained.

The dyestuff used had been obtained as described in Example 26, except that instead of the 15 parts of 1-amino-2-bromo-4-methanesulphonamido-anthraquinone the equivalent amount of 1-amino-2-bromo-4-(4'-methoxy-benzoylamino)-anthraquinone was used.

EXAMPLE 28

100 parts of a woven fabric of anionically modified polyethylene terephthalate are dyed for 30 minutes at 115° C. in a dyebath of 1 part of the dyestuff described in Example 1, 3 parts of oleic acid ethanolamide, 3 parts of oleyl alcohol heptaethylene glycol ether, 12 parts of water and 1600 parts of tetrachlorethylene. After rinsing with fresh tetrachlorethylene and drying, a strong ruby-red dyeing having very good fastness to sublimation, washing and rubbing is obtained.

An equivalent dyeing was also obtained on a woven fabric of anionically modified polyhexamethylenediamine adipate.

What is claimed is:

1. A process of dyeing synthetic fiber material comprising the steps of
   (A) immersing a synthetic fiber material in a dyebath consisting essentially of water-immiscible organic solvent having a boiling point of 40–170° C. and an anthraquinone dyestuff of the formula

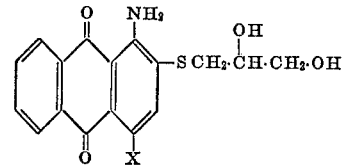

in which X is hydroxyl, $C_1$–$C_6$-alkyl-carbonylamino, $C_1$–$C_6$-alkyl-sulphonylamino, $C_1$–$C_6$-alkoxy-carbonylamino, aryl - carbonylamino, aryl - sulphonylamino, aryloxy-carbonylamino or heteroylamino; and
   (B) keeping said fiber in said dyebath at a temperature of 60–170° C. until the dyebath is exhausted.

2. The process of Claim 1 in which X is hydroxyl; $C_1$–$C_6$-alkyl-carbonylamino; $C_1$–$C_6$ - alkyl-sulphonylamino; $C_1$–$C_6$-alkoxy-carbonylamino; aryl-carbonylamino in which aryl is phenyl-, methylphenyl-, diphenyl-, chlorophenyl-, dichlorophenyl-, methoxyphenyl-, nitrophenyl-, methylnitrophenyl-, α-napthyl- or β-naphthyl-; aryl-sulphonylamino in which aryl is phenyl-, methylphenyl-, chlorophenyl-, dichlorophenyl-, nitrophenyl- or naphthyl-;

aryloxy-carbonylamino in which aryl is phenyl- or 4-nitrophenyl-; heteroylamino in which the heteroyl group is α-furane-, β-thiophene-, nicotine-, iso-nicotine- or α-quinoline-carbonyl.

3. The process of Claim 1 in which X is aryl-carbonylamino in which aryl is phenyl-, methylphenyl-, diphenyl-, chlorophenyl-, dichlorophenyl-, methoxyphenyl-, nitrophenyl-, methylnitrophenyl-, α-naphthyl- or β-naphthyl-; or aryl-sulphonylamino in which aryl- is phenyl-, methylphenyl-, chlorophenyl-, dichlorophenyl-, nitrophenyl- or naphthyl-.

4. The process of Claim 1 in which X is hydroxy.

5. The process of Claim 1 in which X is $C_1$–$C_6$-alkyl-carbonylamino or $C_1$–$C_6$-alkyl-sulphonylamino.

6. The process of Claim 1 in which said water-immiscible organic solvent is an aliphatic chlorohydrocarbon.

7. The process of Claim 1 in which said dyebath contains up to 1% by weight of water relative to said water-immiscible organic solvent.

8. The process of Claim 1 in which said synthetic fiber material is polyester, cellulose triacetate, cellulose 2½ acetate, polyacrylonitrile or polyamide.

9. The process of Claim 1 in which said synthetic fiber material is polyester.

10. The process of Claim 1 in which said dyebath is water-free.

11. The process of Claim 1 in which X is aryl-sulfonylamino and aryl is phenyl-, methylphenyl-, chlorophenyl-, dichlorophenyl-, nitrophenyl- or naphthyl-.

12. The process of Claim 1 in which said dyebath contains up to 1% by weight of water relative to said water-immiscible organic solvent.

References Cited

UNITED STATES PATENTS

| 3,072,683 | 1/1963 | Straley et al. | 260—347.2 |
| 3,486,837 | 12/1969 | Neeff et al. | 8—39 |
| 3,394,133 | 7/1968 | Straley et al. | 260—37 X |

FOREIGN PATENTS

| 870,948 | 6/1961 | Great Britain | 260—371 |
| 1,192,984 | 5/1970 | Great Britain | 8—174 |

THOMAS J. HERBERT, JR., Primary Examiner

U.S. Cl. X.R.

8—174; 260—372, 373, 380